Figures 1, 2:
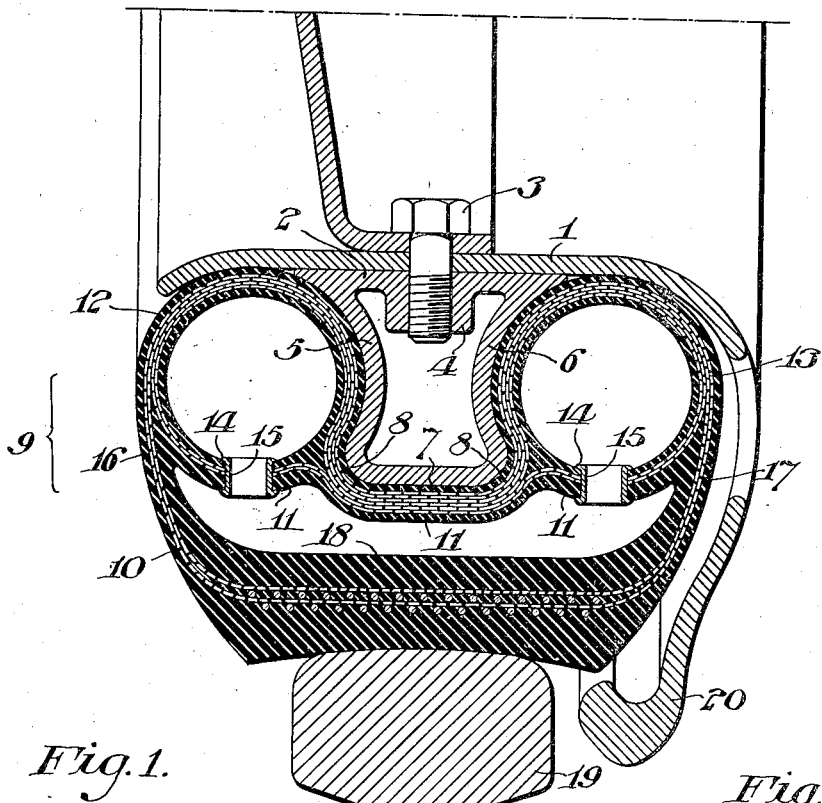

May 5, 1936.  J. LEDWINKA  2,039,726
PNEUMATIC TIRE
Filed June 27, 1932

INVENTOR.
Joseph Ledwinka,
BY John P. Tarbox
ATTORNEY.

Patented May 5, 1936

2,039,726

UNITED STATES PATENT OFFICE 2,039,726

PNEUMATIC TIRE

Joseph Ledwinka, Philadelphia, Pa., assignor to Edward G. Budd Manufacturing Company, Philadelphia, Pa., a corporation of Pennsylvania Application June 27, 1932, Serial No. 619,372

9 Claims. (Cl. 295—31)

The present invention relates to pneumatic tires, and more particularly to a pneumatic tire for flanged railway wheels.

The main object of the present invention is the provision of a tire of the above type having ample air capacity but capable of resisting side sway in relation to the tread portion, and capable of being used when deflated without danger of letting down the wheel flange to within striking distance of the fish plates, frogs or other appurtenances of the trackage.

This object is attained in general by providing the tire with a relatively flat wide main body portion and a pair of tubular beads arranged to clamp on opposite sides of an outwardly projecting, tire retaining rib carried by the wheel rim, and to be held in clamping relation with the rib under inflation pressure. The interiors of the tubular beads communicate with the interior of the main body portion to increase the air capacity of the tire beyond that of the capacity of the main body portion while the retaining rib is extended outwardly into the tire to act as a limit stop to prevent the wheel flange from dropping to within striking distance of the fish plates, frogs or other appurtenances of the trackage.

A preferred embodiment of the invention is illustrated in the accompanying drawing, in which Figure 1 is a transverse section through the wheel, tire and rail head showing the relation of parts when the tire is inflated and under load, and Fig. 2 is a side view of the retaining rib element on a small scale showing the manner in which the same may be divided into sections.

Referring to the drawing in detail, the wheel rim 1 carries an annular, tire-holding rib member 2 secured to the rim in any suitable manner as by a series of bolts, one of which is shown at 3. For the sake of lightness the rib 2 is made hollow as shown, with inwardly projecting bosses 4 bored and threaded to receive the mounting bolts 3. The rib 2 is formed with concave sides 5—6, and a flat periphery 7 with rounded edges 8, for a purpose which will presently appear.

The tire which is indicated as a whole by the numeral 9 comprises a relatively flat main body portion 10 having formed on and as part of its inner wall 11, a pair of relatively large tubular beads 12 and 13 whose interiors communicate with the interior of the main body portion 10 through openings 14 having reinforced side walls or grommets 15. The beads 12 and 13 are circular in cross section and so proportioned and spaced apart in relation to the size and shape of the rib 2 as to fit into the concave sides 5 and 6 in clamping engagement therewith under tension of the inflation pressure and the intervening central portion of the inner wall 11. This central portion of the inner wall 11 continues to the sides of the tire as part and parcel of the outer walls of the tubular beads 12 and 13 joining to the sides of the tire at the points 16—17 and thus providing a transverse web connecting the sides of the tire to prevent side sway. The transverse web thus formed is locked around the rounded corners 8 and flat periphery 7 of the rib member 2 which latter member serves as an anchor for the web, the rounded corners 8 permitting a strong lateral pull on the web without injury to the latter, while the flat peripheral portion 7 together with the central overlapping or covering portion of the web or inner wall 11 extends down into the main body of the tire to within a relatively short distance from the inner surface of the tread portion 18 so as to act as a limit stop to take the load upon deflation, and thus prevent rim cutting or undue bending and break down of the tire walls, and provide a smooth firm load supporting tread for the wheel until the tire can be re-inflated or replaced or properly repaired if necessary.

The transverse web formed by the inner wall 11, being locked about the periphery of the rib 2, the tire is held firmly against side sway. Also the extreme outer or tread portion 18 cannot sway to right or left in relation to the upper part of the tire without greatly increasing the inflation pressure due to reduction of the vertical space between the inner wall 11 and tread wall 18, thus effectively resisting side sway of the tread. Notwithstanding the relatively flat form of the main body of the tire, the tire as a whole is given ample air capacity to maintain the desired resiliency by communication between the interior of the main body portion with the interiors of the tubular beads, through the openings 14.

To maintain the tire centered on the rail head 19, the wheel is provided with a guide flange 20 carried by the rim 1 as an extension thereof and arranged to extend down into the usual guiding relation with the side of the rail head when the tire is under normal inflation and load. Those portions of the tire and wheel which determine the depth of the space between the covered periphery 7 of the rib 2 and the inner surface of the tread portion 18 are so proportioned in relation to the depth of the flange 20 and its height above the fish plates, frogs and other appurtenances of the trackage, not shown, as to prevent the flange from striking any of such appurtenances upon deflation of the tire.

To enable the rib member 2 to be readily assembled with the tire, it may be made in sections preferably as indicated in Fig. 2.

While I have thus shown and described a preferred embodiment of the invention for the sake of disclosure, it is to be understood that the invention is not limited to such specific embodiment but contemplates all such modifications and variants as fall fairly within the scope of the appended claims.

What I claim is:

1. A pneumatic tire comprising a relatively flat main body portion, a pair of tubular bead portions each of a radial depth forming a substantial portion of the radial depth of the tire as a whole and spaced apart laterally to provide a reentrant channel in the tire as a whole, the main body having its side walls interconnected by a transverse web portion disposed in the radially outer zone of said bead portions and the interiors of said bead portions and main body portion being arranged to permit equalization of air pressure therein.

2. A pneumatic tire comprising a main body portion of relatively flat cross section, a pair of relatively large tubular bead portions extending around the inner side of the tire having their remote side walls continuous with the respective side walls of the main body portion and their adjacent side walls spaced apart to form an annular reentrant rim engaging portion in the inner face of the tire as a whole, the radially outer walls of said bead portions being interconnected by a transverse web portion, said bead portions having their interiors in communication with the interior of the main body portion.

3. A pneumatic tire comprising a relatively flat main body portion, a pair of tubular bead portions extending around the radially inner side of the main body portion, one at each side and spaced laterally to form a channel therebetween for holding the tire on a wheel rim, the radially outer walls of the bead portions being connected to the side walls of the main body portion and to each other to form a continuous transverse web portion interconnecting the side walls of the tire as a whole, the parts being arranged to permit communication between the interior of the main body portion and the interiors of the said tubular bead portions.

4. A pneumatic tire comprising a relatively flat main body portion, a pair of large hollow beads extending around the inner face of the main body portion at opposite sides and arranged to engage between them a portion of a wheel rim for securing the tire thereto, the beads being in the form of annular tubes whose outer walls coincide with the lateral portions of the inner wall of the main body portion and are interconnected by the central portion of said inner wall, the interior of the tubular beads communicating with the interior of the main body portion.

5. A pneumatic tire comprising a relatively flat main body portion, a pair of large hollow beads extending around the inner face of the main body portion at opposite sides and arranged to engage between them a portion of a wheel rim for securing the tire thereto, the beads being in the form of annular tubes whose outer walls coincide with the lateral portions of the inner wall of the main body portion and are interconnected by the central portion of said inner wall, said hollow beads and said main body portion being arranged to permit equalization of air pressure therein.

6. A pneumatic tired wheel rim comprising a central outwardly extending annular rib on the rim having a substantially flat periphery and concave sides, a pneumatic tire having a relatively flat main body portion with a pair of relatively large inwardly projecting tubular bead portions engaging the annular rib, each fitting into one of the concave sides of the rib in clamping relation therewith under tension of inflation pressure, the inner wall of the main tire body extending between the tubular bead portions across the periphery of the said rib and continuing to the sides of the tire as part and parcel of the outer walls of the tubular beads to form a transverse web connecting the side walls of the tire, the rib together with the overlying portion of the inner wall of the tire extending into the tire within a relatively short distance from the inner surface of the tread to act as a limit stop upon deflation.

7. The combination with a flanged rail wheel, of a rim for the wheel, an annular outwardly extending rib on the rim, a pneumatic tire having a relatively flat main body portion with a pair of tubular bead portions on the inner side engaging the annular rib each on opposite sides of the rib and in clamping relation under tension of inflation pressure, the said rib with the overlapping portion of the inner wall of the tire extending into the tire within a relatively short distance of the inner surface of the tread wall to act as a limit stop upon deflation, the parts thus forming the limit stop being so proportioned and arranged in relation to the depth of the wheel flange and height of the rail as to prevent the flange from striking the fish plates, frogs or other appurtenances of the trackage upon deflation of the tire.

8. A pneumatic tired wheel comprising a rim, an annular rib extending outwardly from the rim, and a pneumatic tire having a pair of inflatable annular beads on the inner side of the tire arranged to engage the sides of the rib under tension of inflation and interconnected by a transverse wall seated on the radially outer face of said rib.

9. A pneumatic tire comprising a relatively flat main body portion, and a pair of tubular bead portions extending the side walls of the main body radially inwardly, each of said bead portions being of a radial depth forming a substantial portion of the radial depth of the tire as a whole and the bead portions being spaced apart laterally to provide a reentrant channel in the tire as a whole, the side walls of the main body being interconnected by means including a transverse web portion disposed in the radially outer zone of said bead portions and the interiors of said bead portions and main body portion being arranged in communication for inflation with a single body of air.

JOSEPH LEDWINKA.